United States Patent
Cech

(10) Patent No.: US 10,785,624 B2
(45) Date of Patent: Sep. 22, 2020

(54) SYSTEM AND METHOD FOR AUTOMATED NETWORK PAIRING USING ELECTRIC FIELD COUPLING

(71) Applicant: TK Holdings Inc., Auburn Hills, MI (US)

(72) Inventor: Len Cech, Brighton, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 550 days.

(21) Appl. No.: 14/099,260

(22) Filed: Dec. 6, 2013

(65) Prior Publication Data

US 2014/0162586 A1 Jun. 12, 2014

Related U.S. Application Data

(60) Provisional application No. 61/793,319, filed on Mar. 15, 2013, provisional application No. 61/734,848, filed on Dec. 7, 2012.

(51) Int. Cl.
| | |
|---|---|
| *H04W 4/80* | (2018.01) |
| *H04W 4/02* | (2018.01) |
| *H04B 13/00* | (2006.01) |
| *H04L 29/08* | (2006.01) |
| *H04W 4/90* | (2018.01) |
| *H04W 4/48* | (2018.01) |

(52) U.S. Cl.
CPC ............ *H04W 4/80* (2018.02); *H04B 13/005* (2013.01); *H04W 4/023* (2013.01); *H04L 67/12* (2013.01); *H04W 4/48* (2018.02); *H04W 4/90* (2018.02)

(58) Field of Classification Search
CPC combination set(s) only.
See application file for complete search history.

(56) References Cited

U.S. PATENT DOCUMENTS

| | | | |
|---|---|---|---|
| 5,722,686 A | 3/1998 | Blackburn et al. |
| 5,802,479 A | 9/1998 | Kithil et al. |
| 6,014,602 A | 1/2000 | Kithil et al. |
| 6,256,503 B1 | 7/2001 | Stephens |

(Continued)

FOREIGN PATENT DOCUMENTS

| | | |
|---|---|---|
| CN | 1802273 A | 7/2006 |
| CN | 201204700 Y | 3/2009 |

(Continued)

OTHER PUBLICATIONS

Non-final Office Action dated Oct. 3, 2014 issued in connection with U.S. Appl. No. 13/735,816.

(Continued)

*Primary Examiner* — Zhiyu Lu
(74) *Attorney, Agent, or Firm* — Gordon Rees Scully; Mansukhani, LLP

(57) ABSTRACT

A system to electronically connect an electronic device to a network includes a sensing electrode that provides a signal. The signal has a particular frequency and power, and the electrode is configured to transmit the signal through a person occupying a proscribed location. The electronic device is configured to detect the signal when the electronic device is coupled to a person occupying the proscribed location. The electronic device is configured to electronically couple to the network upon detecting the signal.

18 Claims, 2 Drawing Sheets

(56) References Cited

U.S. PATENT DOCUMENTS

| | | |
|---|---|---|
| 6,256,558 B1 | 7/2001 | Sugiura et al. |
| 6,392,542 B1 | 5/2002 | Stanley |
| 6,690,940 B1 | 2/2004 | Brown et al. |
| 6,771,161 B1 | 8/2004 | Doi et al. |
| 7,180,306 B2 | 2/2007 | Stanley et al. |
| 7,639,148 B2 | 12/2009 | Victor |
| 7,856,203 B2 | 12/2010 | Lipovski |
| 8,571,476 B2 | 10/2013 | Arndt et al. |
| 9,402,269 B2 | 7/2016 | Cavalcanti |
| 2003/0220725 A1 | 11/2003 | Harter et al. |
| 2004/0198306 A1 | 10/2004 | Singh et al. |
| 2005/0255874 A1 | 11/2005 | Stewart-Baxter et al. |
| 2006/0025098 A1 | 2/2006 | Peusens et al. |
| 2006/0208577 A1 | 9/2006 | Richter et al. |
| 2007/0001828 A1 | 1/2007 | Martinez |
| 2007/0285218 A1 | 12/2007 | Fletcher et al. |
| 2009/0215466 A1 | 8/2009 | Ahl et al. |
| 2009/0233548 A1 | 9/2009 | Andersson et al. |
| 2009/0295554 A1 | 12/2009 | Hansen |
| 2010/0009626 A1 | 1/2010 | Farley |
| 2010/0057332 A1* | 3/2010 | Katoh et al. ............... 701/113 |
| 2010/0069001 A1* | 3/2010 | Arndt ................... H04B 5/0012 |
| | | 455/41.1 |
| 2010/0134307 A1* | 6/2010 | Witte ..................... E05B 81/78 |
| | | 340/665 |
| 2010/0238955 A1 | 9/2010 | Sung et al. |
| 2010/0272076 A1* | 10/2010 | Cavalcanti .......... H04W 74/004 |
| | | 370/336 |
| 2010/0295695 A1 | 11/2010 | Kedenburg et al. |
| 2011/0021234 A1* | 1/2011 | Tibbitts ................. H04W 48/04 |
| | | 455/517 |
| 2011/0117903 A1 | 5/2011 | Bradley |
| 2011/0136509 A1 | 6/2011 | Osann, Jr. |
| 2011/0153118 A1 | 6/2011 | Lim et al. |
| 2011/0294465 A1 | 12/2011 | Inselberg |
| 2012/0021717 A1 | 1/2012 | Schmidt |
| 2012/0046020 A1 | 2/2012 | Tomasini |
| 2012/0088446 A1 | 4/2012 | Fyke et al. |
| 2012/0119902 A1* | 5/2012 | Patro ...................... H04L 12/12 |
| | | 340/502 |
| 2012/0244883 A1 | 9/2012 | Tibbitts et al. |
| 2012/0268145 A1 | 10/2012 | Chandra et al. |
| 2013/0109305 A1 | 5/2013 | Savoj et al. |
| 2013/0176100 A1 | 7/2013 | White et al. |
| 2013/0231046 A1 | 9/2013 | Pope et al. |

FOREIGN PATENT DOCUMENTS

| | | |
|---|---|---|
| CN | 101742603 A | 6/2010 |
| CN | 101743694 A | 6/2010 |
| CN | 101807344 A | 8/2010 |
| CN | 101911808 A | 12/2010 |
| EP | 0 751 403 A1 | 1/1997 |
| JP | 3183209 | 7/2001 |
| KR | 10-2001-0022480 | 3/2001 |
| WO | WO 2013/103963 A1 | 7/2013 |

OTHER PUBLICATIONS

International Search Report PCT/US2013/020533 dated Apr. 30, 2013.
International Search Report dated Jan. 27, 2015 issued in PCT/US2014/063873.
Written Opinion issued in PCT/US2013/020533 dated Apr. 30, 2013.
International Search Report dated Mar. 14, 2014 issued in connection with International Application No. PCT/US2013/073603.
Written Opinion of the International Searching Authority dated Mar. 14, 2014 issued in connection with International Application No. PCT/US2013/073603.
European Supplementary Search Report dated Jun. 24, 2016 issued in EP 13 86 0801.
First Office Action and Search Report dated Feb. 3, 2017 issued in corresponding Chinese Application No. CN 201380070875.2 (with translation).
Second Office Action and Search Report dated Sep. 30, 2017 issued in corresponding Chinese Application No. CN 201380070875.2.

* cited by examiner

SYSTEM AND METHOD FOR AUTOMATED NETWORK PAIRING USING ELECTRIC FIELD COUPLING

CROSS REFERENCE TO RELATED APPLICATIONS

The present application claims priority to and the benefit of U.S. Provisional Patent Applications Nos. 61/734,848 and 61/793,319 filed on Dec. 7, 2012 and Mar. 15, 2013, respectively. The foregoing provisional applications are incorporated by reference herein in their entireties.

BACKGROUND

The present application relates generally to the field of wireless communication systems between an electronic device and a fixed communications network. An electronic device may include, for example, a cell phone, smart phone, PDA, tablet computer, laptop computer, e-reader, and handheld video game.

The increased use of electronic devices, particularly mobile communications devices, currently allows for continuous communication, entertainment, and the transfer of information from nearly any location. As a result, many individuals carry such electronic devices in direct physical proximity to their bodies throughout the day.

Various systems and methods to electromagnetically couple or "pair" a handheld electronic device with a fixed communication network (e.g., a vehicle communication bus) are known in the art. Further, some systems may automatically detect an electronic device, and enable its "hands-free" application use. Such systems may require a user to perform an initial setup process between the fixed communication network and the electronic device (e.g., a setup process may identify a particular electronic device by using a serial code, mobile equipment identifier (MEID), or similar identifier). Further, each new user, and each additional device may be required to undergo an initial setup process.

Such systems that automatically electromagnetically couple an electronic device may also require that the user has enabled automated pairing between the device and a network. Automated pairing between an electronic device and a network may use an electronic information exchange paradigm, such as Bluetooth or Wifi. Further, a fixed communications network may initiate a pairing process, and detect every electronic device enabled to communicate within the selected communication paradigm (e.g., Bluetooth, Wifi) independent of the location of the user or the device. Therefore, current pairing techniques may not independently identify the physical location of the user or the device.

In some situations, there may be a need to control an electronic device based on the location of the user or the device. For example, federal laws and regulations restrict the use of an electronic device on an airplane. Therefore, in accordance with such laws, a system or method may be used to control the use of an electronic device on an airplane.

In addition, a person who is driving a vehicle or operating a machine may be impaired by their concurrent use of an electronic device. Therefore, in order to prevent a vehicular accident, a system or method may be used to control an electronic device based on the actual physical location of either the person or the device.

Various systems and methods that estimate, or determine the proximate location of a device are known in the art. For example, GPS and/or cellular network triangulation may indicate that an electronic device is in motion, and cooperatively-loaded application software on the electronic device may control handheld use of the device. However, these systems and methods cannot distinguish whether the electronic device is in the possession of a driver or a passenger. Therefore, a passenger of a vehicle (i.e., someone other than the driver), whose use of an electronic device is not impaired from operating a vehicle, may have to manually bypass a system or method used to control the electronic device.

Further, various systems or methods used to control an electronic device may not distinguish between different modes of transportation. For example, while it may be desired to control the use of an electronic device by a driver of a vehicle, the same electronic device may not need to be controlled for use on public transportation (e.g., train, bus, taxi, etc.).

In an alternative system, a wireless transmitter for a fixed communications network, such as a vehicle communication bus, may transmit a signal to an electronic device that includes information relating to a condition of a network. In the case of a vehicle, the information in a signal may include whether the vehicle is in motion or in gear. Cooperatively loaded application software on an electronic device may detect the signal from the fixed communications network. Depending on the information included in the signal, the application software may control various features of the electronic device. For example, cooperatively loaded application software on the electronic device may use information from a signal to limit the handheld use of the device, or to provide cellular notification to back-end services (e.g., speed alerts).

A system or method for automated network pairing using electric field coupling may require an electronic device to include hardware that can receive or transmit a signal to the fixed communications network. A system or method for automated network pairing using electric field coupling may also require software to interface with the fixed communications network or detect a signal transmitted by the fixed communications network. Such an electronic device that is in proximity to detect a signal transmitted by the network may be controlled by the cooperatively installed software on the device.

A system or method to that can detect, electronically couple with, and control an electronic device may not distinguish between a device used by an intended user (i.e., a driver of a vehicle) and an unintended user (i.e., a passenger of a vehicle). Further, an unintended user may be required to manually bypass the system or method to control an electronic device. Therefore, an object of the present disclosure is a system or method to control an electronic device used by a particular user or in a particular location.

SUMMARY

According to an exemplary embodiment of this disclosure, a system to electronically couple an electronic device to a network may include a sensing electrode that provides a signal. The signal provided by the sensing electrode may have a particular frequency and power, and the electrode may be configured to transmit the signal through a person occupying a proscribed location. The electronic device may be configured to detect the signal when the electronic device is coupled to a person occupying the proscribed location, and when the device detects the signal it may be configured to electronically couple to the network upon detecting the signal.

According to an alternative embodiment of the disclosure, a system to electronically couple an electronic device to a network may include a sensing electrode that provides a signal. The signal may have a particular frequency and power, and the sensing electrode may be configured to transmit the signal to the electronic device when the electronic device is positioned in a proscribed location. The electronic device may be configured to detect the signal when the second electronic device is either positioned in the proscribed location, and when the electronic device detects the signal, the electronic device may be configured to electronically couple to the network.

According to yet another alternative embodiment of the disclosure, a method for electronically coupling an electronic device to a network using electric field coupling may include several steps. For example, a method may transmit an electronic signal from a sensing electrode to a person occupying a proscribed location and coupled to the second electronic device. Based upon detection of the signal by the electronic device, a method may electronically couple the electronic device to the network. The signal may be configured to be redistributed through a person via electric field coupling, and the electronic device may be coupled to the person in order to electronically couple to the network.

BRIEF DESCRIPTION OF THE DRAWINGS

Features, aspects, and advantages of the present disclosure will become apparent from the following description, and the accompanying exemplary embodiments shown in the drawings, which are briefly described below.

DETAILED DESCRIPTION

Various embodiments of the present disclosure will be described below with reference to the drawings. It is to be understood that both the foregoing general description and the following detailed description are exemplary and explanatory only, and are not restrictive of the disclosure.

According to an exemplary embodiment, a system and method may identify and establish a communication paradigm between a fixed network and an electronic device in which the communication medium is through the human body.

A system proposed herein may dependently associate the physical presence (e.g., held in hand, in pocket, etc.) of an occupant with a location of the electronic device (e.g., vehicle seating location). Such a system may allow one-way or two-way communication between a fixed network and the electronic device, and through an occupant, in order to dependently establish control/communication parameters of the device, as well as software application activation, based on a specified position of the device.

Figure 1:
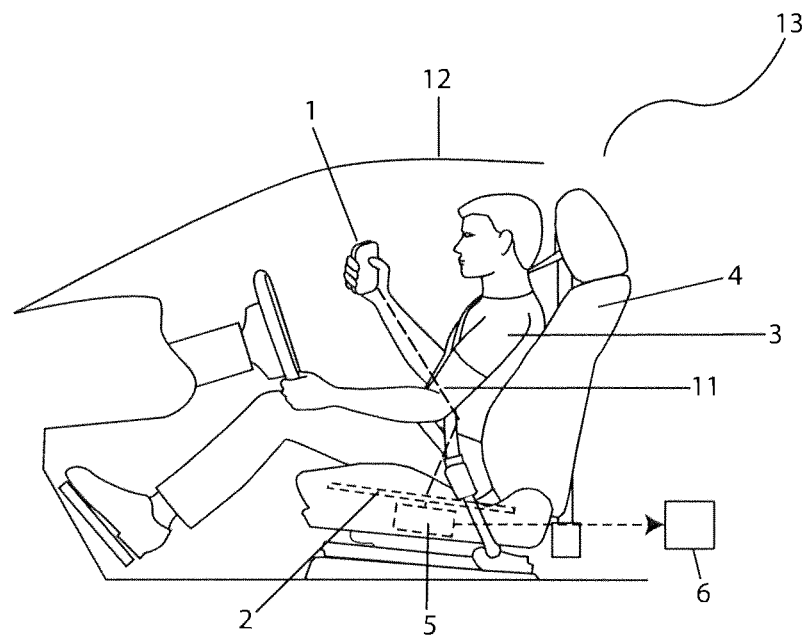
FIG. 1 is a schematic side view of a vehicle interior showing a system for facilitating the communication between an electronic device and the vehicle, in accordance with an exemplary embodiment of the disclosure.

As shown in FIG. 1, and according to an exemplary embodiment, an electric field coupling network 11 may be used to electronically couple or pair a fixed communications network, such as a vehicle communications bus 6, with an electronic device 1. A driver 3 of a vehicle 12 may be seated on a vehicle seat 4, and an electronic device 1 may be coupled to the driver (e.g., an electronic device 1 may be held in the hand of the driver 3, in a pocket of the driver's clothes, or in any other location that is sufficiently proximate to the driver). A system 13 used to electronically couple an electronic device to a network may include a capacitive sensor pad 2 provided in a vehicle seat 4 within a vehicle 12. While sensor pad 2 may be provided in a driver's seat 4 of a vehicle, this disclosure is not intended to limit the possible locations in which a sensor pad may be located. Therefore, according to alternative embodiments of this disclosure, a sensor pad could be located anywhere in a vehicle interior (i.e. in a passenger seat, the vehicle floor, an arm rest, the steering wheel, a cup holder, etc.).

Figure 2:
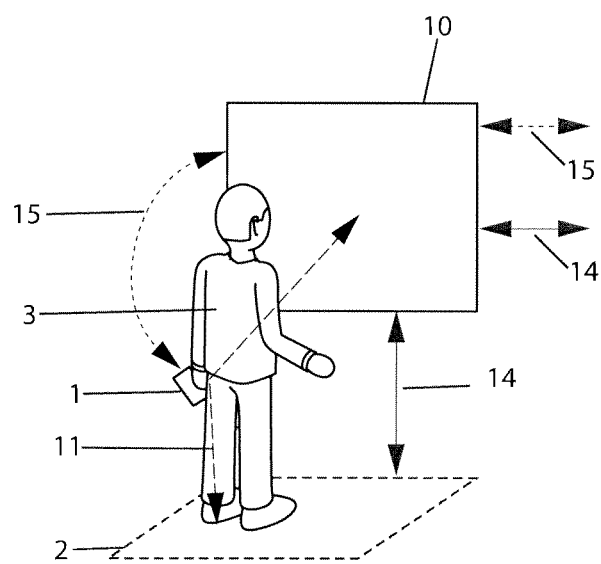
FIG. 2 is a schematic view of a system for facilitating the communication between an electronic device and a human-machine interface (HMI) via a standing person, in accordance with an alternative exemplary embodiment of the disclosure.
Figure 3:
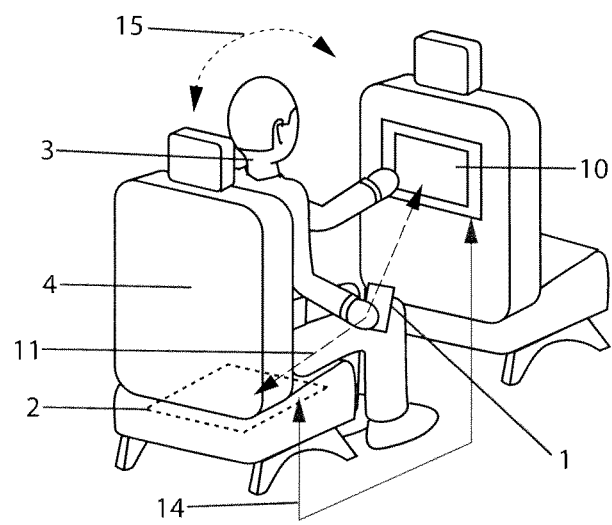
FIG. 3 is a schematic view of a system for facilitating the communication between an electronic device and a human-machine interface (HMI), wherein the system is implemented in a front and rear seat configuration, in accordance with an alternative exemplary embodiment of the disclosure.

Referring to FIGS. 1-3, and according to various embodiments of this disclosure, a sensing electrode, which may be configured as a sensor pad 2, may be able to detect the presence or occupancy of a person or object that is positioned within a proscribed location. Further, sensor pad 2 may be configured to detect various characteristics of an object, such as its position on a seat. Sensor pad 2 may also be configured to discriminate or categorize the object (e.g., person, baby seat, shopping bag, etc.), and to detect other characteristics of the object (e.g., stature, position, loading, etc.). In addition, sensor pad 2 may be provided as a component of another system, such as an occupant detection or classification system.

Referring to FIGS. 1-3, and according to various embodiments of this disclosure, a system 13 may also be configured to transmit a signal 11 to a conductor in the sensor pad 2 and through a person positioned within a proscribed location. When the system is used for occupant sensing a sensing circuit may be provided for signal generation and occupant sensing. Alternatively, a separate control unit including a signal generator may be provided. The signal generator provides a signal, e.g., a sinusoidal signal, to an electrode in the seat or floor or other location proximate to the person. For instance, the transmitted signal 11 may have a particular frequency and power, and the frequency of the transmitted signal 11 may be configured to allow it to be redistributed through the person via electric field coupling when the person is positioned within a proscribed location. Such a signal may be configured so that it is not strong enough to be transmitted through the air surrounding a person positioned within a proscribed location.

According to an exemplary embodiment shown in FIG. 1, sensor pad 2 may transmit a signal 11, which may be configured to be redistributed via electric field coupling through driver 3 that is sitting on seat 4. According to an alternative embodiment shown in FIG. 2, a sensor pad may be disposed within a floor, be configured to transmit a signal 11 to a person 3, who is standing over sensor pad 2. The transmitted signal 11 may be configured to be redistributed through person 3 via electric field coupling.

Sensor pad 2 may also be electronically coupled to support electronics 5 which may be configured to measure the amount of electric field coupling between sensor pad 2 and objects proximate the sensor pad. According to an exemplary embodiment shown in FIG. 1, the support electronics 5 may be, in turn, electronically coupled to a vehicle communication bus 6. The support electronics may include at least one integrated circuit, discrete electronic components, printed circuit board, or microprocessor, for example. The capacitive sensing subsystem employed with the system may be similar to the systems disclosed in U.S. Pat. No. 6,392,542 and U.S. Published Patent Application No. 2007/0200721 (both incorporated by reference herein).

As shown in FIG. 1, and according to various exemplary embodiments of this disclosure, an electronic device 1 may be configured to detect the transmitted signal 11 when the signal 11 is transmitted through a person, and the electronic device 1 is coupled to the person. According to the embodiment shown in FIG. 1, an electronic device 1 may be configured to detect the transmitted signal 11 when electronic device 1 is positioned within a proscribed location, such as the driver's seat of a vehicle. The detection of the signal may be conducted utilizing a tuning circuit located in the electronic device. Exemplary tuning circuits are disclosed, for example, in U.S. Published Patent Application No. 2011/0117863. The foregoing published patent application is incorporated by reference herein.

Further, when an electronic device detects the transmitted signal 11, a response of the device may be to electronically couple, or interface, with a fixed communications network, such as a vehicle communication bus 6. An electronic device 1 may also include hardware and/or software to facilitate or control the coupling of the electronic device to a fixed communications network.

According to an exemplary embodiment, the transmitted signal 11 may be configured to carry particular information used to distinguish it from other signals, such as digital or analog information. Further, the power of the transmitted signal 11 may be configured to be sufficiently strong to be transmitted through a person who is coupled to an electric field generated around the signal carrying sensing electrode, but not sufficient to be transmitted from the person's body. Therefore, an electronic device may be configured to detect the signal 11 only when the person is concurrently coupled to the electronic device and the electric field. When the electronic device detects the signal 11, it may distinguish the signal based on the information contained in the signal.

According to an exemplary embodiment, upon detection of the signal 11, the electronic device 1 may initiate a pairing process with a fixed communications network in which the electronic device 1 automatically connects to the network. A pairing process may be accomplished in a variety of ways. For example, in order to ensure the security of the connection, the electronic device 1 may initiate the pairing process by transmitting a wireless signal to the network. In order for the network to distinguish the signal transmitted from the electronic device 1, and to ensure the security of the connection between the device and the network, the signal may be configured to have a particular frequency or to carry particular information. The electronic device 1 and the network may perform a variety of processes in order to maintain security therebetween. For example, the device and network may be time-synced and the network may use an algorithm to determine a random frequency pattern that is shared with the electronic device 1. While some examples have been described in which an electronic device may automatically connect with a fixed network, it should be understood that the electronic device 1 disclosed herein may perform a variety of methods in order to connect to a fixed communications network, according to other exemplary embodiments.

According to an exemplary embodiment, the fixed communication network may also initiate a pairing process in order to connect to the electronic device 1. For example, the network may continuously transmit a wireless signal to a surrounding area. Alternatively, the network may transmit a wireless signal to a surrounding area when a person is detected within a proscribed location (e.g., a proscribed location may be proximate a sensing electrode that transmits a capacitive signal). The wireless signal transmitted from the network may use an authorization or identification process establish a secure connection with an electronic device. Such an identification process may require the electronic device 1 to transmit a signal having particular information to the network. Concurrently, the electronic device 1 may be coupled to a capacitive signal that is transmitted from a proscribed location, and the signal may contain particular information. When the electronic device detects the capacitive signal, it may use the particular information contained within the capacitive signal to satisfy the network's authorization or identification process. In order to maintain a secure connection, the electronic device 1 and the network may be time-synced and the network may use an algorithm to determine a random frequency pattern that is shared with the electronic device 1. While some examples have been described in which a network may automatically connect with the electronic device 1, it should be understood that the network and the electronic device 1 disclosed herein may perform a variety of methods in order to automatically establish a connection, according to other exemplary embodiments.

Referring now to FIG. 2, an alternative exemplary embodiment is shown for a system that may use electric field coupling to automatically connect to a network. The system may include a capacitive sensor pad 2 proximate to a standing person 3 (e.g. the sensor pad may be embedded in a floor). A sensor pad may be positioned so that a person 3 standing thereon is within proximity of a human machine interface (HMI) device (e.g., audio, video, tactile, etc.). The sensor pad shown in FIG. 2 may transmit a signal 11 having a capacitively coupled frequency. In other words, the transmitted signal 11 may be configured to be redistributed through a person 3 via electric field coupling. When person 3 is positioned within sufficient proximity of a sensor pad 2, an electronic device 1 coupled to person 3 may be electronically coupled to a fixed communications network, such as a HMI device, and any network that is simultaneously electronically coupled to the fixed communications network. Information may be exchanged among each of these networks when electronic device 1 is electronically coupled to a fixed communications network or other network.

Referring now to FIG. 3, an alternative embodiment is shown for a system that may be implemented in a particular seating configuration in which a seat is positioned behind another seat. Such a seating configuration may be used, for example, within a bus, train, or airplane. A capacitive sensor pad 2 may be mounted within a seat 4 that is configured according to the arrangement shown in FIG. 3. Further, a fixed communications network, such as a human machine interface (HMI) device 10 (e.g., audio, video, tactile, etc.) shown in FIG. 3, may be positioned on a rear facing surface of an adjacent seat, compartment wall, or bulkhead. Sensor pad 2 may be configured to transmit a signal 11 through a person 3 who is seated on seat 4. An electronic device 1 coupled to person 3 may be configured to detect the transmitted signal 11, and electronically couple to HMI device 10. Therefore, when person 3 is occupied within a particular location proximate a HMI device, a communication state may be established between an device 1, the HMI device, and any wired network 14 or wireless network 15 that is electronically coupled to the HMI device. Such a system may be used to facilitate the exchange of information between sensor pad 2, electronic device 1 and HMI device 10.

Figure 4:
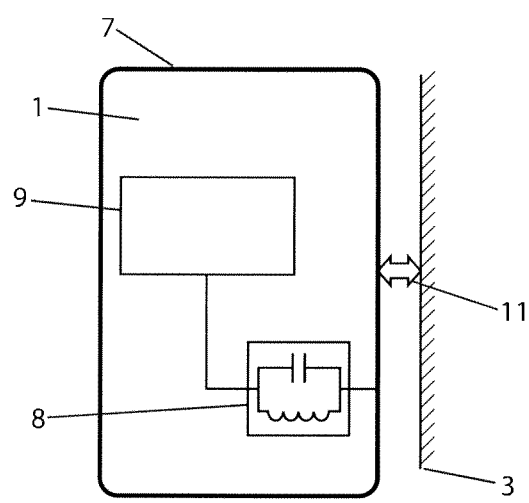
FIG. 4 is a schematic view of an electronic device for use with the system shown in the embodiments of FIGS. 1-3.

According to an exemplary embodiment shown in FIG. 4, an electronic device 1 may include a communication module 9 and a tuned circuit 8. Communication module 9 may include several sub-modules configured to detect, filter, modulate, or demodulate signals, including wireless digital or analog signals. Communication module 9 may also include a digital signal processor, among other components. A tuned circuit 8 may be coupled to a component of an electronic device 1, such as an outer casing 7 or a tuned antenna. The tuned circuit 8 may be configured to detect a signal 11 having a capacitive coupled frequency (e.g., approximately 200 Khz) when the device is in contact with or proximate to a person's body (e.g., finger, hand, skin in proximity to a pocket, waistbelt, etc.). While a signal 11 having a frequency of approximately 200 Khz is suggested, this is not intended to limit the scope of this disclosure or the range of possible frequencies that may be used be transmitted through a person or to an electronic device via electric field coupling.

According to yet another embodiment of this disclosure, a method to electronically couple an electronic device to a fixed communication network may transmit an electronic signal from a sensing electrode to a person occupying a proscribed location and coupled to the electronic device. Based upon detection of the signal by the electronic device, the electronic device may electronically couple the electronic device to the network. In such a method, the signal may be configured to be redistributed through a person via electronic field coupling. Further, the electronic device may have to be coupled to the person in order to detect the signal.

In summary, a system or method may use electric field coupling to electronically couple or "pair" an electronic device 1 with a network may generate a signal having a capacitive coupled frequency. For example, an electrode in a capacitive sensing subsystem may transmit a signal having a capacitive coupled frequency. The signal may be configured to be transmitted across a person who is sufficiently proximate to an electrode or sensing pad generating the signal. A tuned circuit 8 of an electronic device 1 that is sufficiently proximate to the person's body may detect the signal having a capacitive coupled frequency. An electronic device 1 may be configured to detect a signal having a capacitive coupled frequency, and either a communication module 9 or the electronic device 1 may be configured to automatically pair with a network that is electronically coupled to the capacitive sensing subsystem.

A sensor pad and supporting electronics may cooperate with hardware and software added to an electronic device to detect the location and possession of the device. According to an exemplary embodiment, when an electronic device is detected in a particular location, this information may be used, for example, to disable the use of an electronic device in possession of the driver while the vehicle is operational. In a similar fashion, a system may be configured to detect and control an electronic device 1 that is placed on an unoccupied seat (e.g., when a driver places a cell phone on an empty passenger seat).

According to alternative embodiments of this disclosure, a sensor pad may be incorporated into various other vehicle compartments. For example, a sensor pad may be embedded in a cup-holder, a phone receptacle or another location where an electronic device may be placed. According to an alternative embodiment, a sensor pad 2 may be located in a passenger seat, and configured to generate a signal 11 having a capacitive coupled frequency. An electronic device 1 may detect the transmitted signal 11 via electronic field coupling when the device is placed on the seat, or when the device is otherwise within sufficient proximity of the transmitted signal 11. When electronic device 1 detects the transmitted signal 11, various hardware or software of electronic device 1 may automatically control its use while the vehicle is in motion. Also, hardware or software of electronic device 1 may electronically couple or "pair" the device with a vehicle communication bus 6 and enable hands-free technology.

According to alternative embodiments of this disclosure, a system to electronically couple an electronic device and a fixed communications network may be utilized in a wide variety of locations, including personal and public transportation vehicles, homes, schools, business locations, and other venues. Advantageously, several personalized and selectable communications modes, which are based on the physical location of an electronic device, may exist for particular systems used to electronically couple an electronic device and a fixed communications network, may be configured to operate in the system may include personalized, selectable communication modes based on physical locations (e.g., a car driver mode, a car passenger mode, a bus mode, a plane mode, a train mode, a theater mode, etc.) where the characteristics of the automated network would be set based on mode (e.g., cell phone ringer disabled in movie theater; hands-free enabled in car driver seat; music/video playback enabled in bus, infotainment system enabled in a plane seat back, etc.).

Advantageously, according to various embodiments of this disclosure, a system 13 may allow a single fixed communications network, such as a HMI, to be customizable by a specific human touch by allowing a user interface to function differently for multiple proximal occupants. In other words, a HMI may distinguish between a person who is positioned within a particular location, and a person positioned in an alternative location. For example, an HMI in the form of a dash-mounted touch screen in a vehicle may be configured to function in a first manner with respect to a driver of the vehicle, and in a second manner for a passenger of the vehicle.

A system 13 may be configured so that the electric field characteristics of the sensor pad change from a first configuration (i.e., a normal operating configuration) to a second configuration when a vehicle event occurs. A signal having a second configuration may enable an alternative means of network communications between an electronic device 1 and a fixed communications network. For example, if a vehicle experiences an event, such as a vehicle collision, or a roll-over, sensor pad 2 may transmit a signal having a second configuration which all electronic devices within the vehicle compartment may be configured to detect. When an electronic device detects a signal having a second configuration, the device may be configured to automatically initiate an emergency phone call.

Advantageously, one skilled in the art will appreciate that a system may be configured to provide enhanced security when electronically coupling to an electronic device by dependently relying on occupancy or physical possession of a particular device. Further, additional security may be provided, in addition to other limitations, such as requiring a password, an encryption, and other wireless connectivity limitations.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the sensing electrode may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

What is claimed is:

1. A system to electronically couple an electronic device, located in proximity to an occupant of a vehicle, to a vehicle communications network located in the vehicle, the system comprising:
   a sensing electrode located in the vehicle proximate to the occupant; and
   support electronics located in the vehicle and including a sensor circuit configured to provide a signal having a particular frequency and power to the sensing electrode to thereby create an electric field proximate to the person, wherein the signal contains particular information;
   wherein the electronic device is configured to detect the presence of the signal provided to the sensing electrode and conducted through the occupant;
   wherein the electronic device is configured to electronically couple to the vehicle communications network upon detecting the signal; and
   wherein the electronic device is configured to electrically couple to the vehicle communications network via a wireless signal and after completion of a security process required by the vehicle communications network that includes using the particular information contained within the signal to satisfy an identification process that ensures that the electronic device is authorized to be connected to the vehicle communications network.

2. The system of claim 1, wherein the sensor circuit is configured to detect the presence of the occupant in proximity to the sensing electrode.

3. The system of claim 1, wherein the electronic device is configured so that the electronic device cannot detect the signal when the occupant is not occupying a proscribed location proximate to the sensing electrode.

4. The system of claim 1, wherein when the vehicle is in an emergency state, the sensing electrode is configured to transmit a second signal, and wherein the electronic device is configured to detect the second signal, and upon detection of the second signal a response of the electronic device is to initiate an emergency response.

5. A system to electronically couple an electronic device, located in proximity to an occupant of a vehicle, to a vehicle communications network located in the vehicle, the system comprising:
   an electrode located proximate to the occupant; and a signal generator located in the vehicle and configured to provide a signal containing predetermined information and having a particular frequency and power to the sensing electrode to thereby create an electric field proximate to the electrode;

wherein the electronic device is configured to detect the presence of the signal and the predetermined information provided to the electrode and conducted through the occupant;

wherein the electronic device is configured to automatically initiate a pairing process with the vehicle communications network upon detecting the signal by transmitting a wireless signal to the vehicle communications network; and wherein the pairing process includes the step of the electronic device transmitting a security signal to the vehicle communications network, and wherein the transmitted security signal includes the predetermined information received from the signal generator that is required to be received by the vehicle communications network before the electronic device and can be coupled to the vehicle communications network.

6. The system of claim 1, wherein the wireless signal is transmitted by the vehicle communications network.

7. The system of claim 6, wherein the sensor circuit is configured to detect the presence of the occupant in proximity to the sensing electrode.

8. The system of claim 7, wherein the network is configured to transmit the particular information when the presence of the occupant is detected.

9. A system to electronically couple an electronic device, located in proximity to a person in a vehicle, to a vehicle network located in the vehicle, the system comprising:

an electrode located proximate to the person; and a signal generator located in the vehicle and configured to provide a signal having a particular frequency and power to the electrode to thereby create an electric field proximate to the electrode;

wherein the electronic device is configured to detect the presence of the signal provided to the electrode and conducted through the person;

wherein the electronic device is configured to electronically couple to the vehicle network via a wireless signal upon detecting the signal; and wherein the electronic device is configured to be electrically coupled with the vehicle network utilizing a time-synchronization pattern that is generated by the vehicle network and is carried by the signal through the electrode and person to the electronic device.

10. The system of claim 9, wherein the signal generator is configured to change the signal provided to the electrode based on a parameter of the vehicle.

11. The system of claim 10, wherein the electrode is located in proximity to the driver of the vehicle and the electronic device is configured so that when the vehicle is moving the electronic device is disabled.

12. The system of claim 9, wherein the electronic device is configured to operate in a plurality of communication modes based on the location of the person and the electrode; and wherein the electronic device is configured to operate in a driver mode and a passenger mode wherein the use of the electronic device is more restricted in the driver mode than in the passenger mode.

13. The system of claim 1, wherein the electronic device is configured to transmit the particular information to the vehicle communications network during the security process.

14. The system of claim 1, wherein the electronic device is configured to be electrically coupled and exchange transmissions with the vehicle communications network utilizing a time-synchronization pattern.

15. The system of claim 14, wherein the time-synchronization pattern is generated by the vehicle communications network and transmitted to the electronic device.

16. The system of claim 1, wherein the electronic device is configured to vary the frequency of a transmission signal being received by the vehicle communications network.

17. The system of claim 16, wherein the vehicle communications network generates a pattern associated with the variance of the frequency of the transmission signal.

18. The system of claim 17, wherein the vehicle communications network transmits the pattern to the electronic device.

* * * * *